United States Patent
Bajaj et al.

(10) Patent No.: US 8,996,607 B1
(45) Date of Patent: Mar. 31, 2015

(54) IDENTITY-BASED CASTING OF NETWORK ADDRESSES

(75) Inventors: Girish Bansilal Bajaj, Bellevue, WA (US); Zhi An, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 693 days.

(21) Appl. No.: 12/801,344

(22) Filed: Jun. 4, 2010

(51) Int. Cl.
 *G06F 15/16* (2006.01)
 *G06F 15/173* (2006.01)
 *H04L 29/08* (2006.01)

(52) U.S. Cl.
 CPC ........ *H04L 67/1006* (2013.01); *H04L 67/1008* (2013.01)
 USPC ............ 709/203; 709/217; 709/226; 709/241

(58) Field of Classification Search
 CPC ............ H04L 29/08621; H04L 67/146; H04L 41/0896; H04L 47/821; H04L 67/1006; H04L 67/1008
 See application file for complete search history.

(56) References Cited

U.S. PATENT DOCUMENTS

| | | | |
|---|---|---|---|
| 6,430,618 B1 * | 8/2002 | Karger et al. | 709/225 |
| 6,553,420 B1 * | 4/2003 | Karger et al. | 709/226 |
| 6,947,992 B1 * | 9/2005 | Shachor | 709/228 |
| 7,321,925 B2 * | 1/2008 | Trethewey | 709/219 |
| 7,715,396 B2 * | 5/2010 | Castro et al. | 370/392 |
| 7,783,763 B2 * | 8/2010 | Tuel | 709/228 |
| 8,082,351 B1 * | 12/2011 | Kelley et al. | 709/227 |
| 2002/0072980 A1 * | 6/2002 | Dutta | 705/26 |
| 2002/0116474 A1 * | 8/2002 | Copeland et al. | 709/219 |
| 2002/0169889 A1 * | 11/2002 | Yang et al. | 709/244 |
| 2003/0051042 A1 * | 3/2003 | Tazoe | 709/229 |
| 2004/0117493 A1 * | 6/2004 | Bazot et al. | 709/229 |
| 2005/0237379 A1 * | 10/2005 | Brooksby et al. | 348/14.11 |
| 2006/0155857 A1 * | 7/2006 | Feenan et al. | 709/227 |
| 2007/0271385 A1 * | 11/2007 | Davis et al. | 709/228 |
| 2008/0244067 A1 * | 10/2008 | Ushiyama | 709/224 |
| 2010/0191689 A1 * | 7/2010 | Cortes et al. | 706/46 |
| 2010/0223364 A1 * | 9/2010 | Wei | 709/220 |

\* cited by examiner

*Primary Examiner* — Azizul Choudhury
(74) *Attorney, Agent, or Firm* — Knobbe, Martens, Olson & Bear, LLP

(57) ABSTRACT

Systems, methods, and computer-readable media identify a server to a client device. In one implementation, server identification data is stored for a plurality of servers associated with a service. An identifier of a client device is received. One of the plurality of servers is selected to provide the service to the client device, and the server is selected based on the identifier of the client device. The server identification data for the selected server is provided to the client device. The selected server may receive a request to access the service from the client device, and may process the request consistent with state data stored at the selected server.

21 Claims, 6 Drawing Sheets

| IP Address Table 213 |||
| --- | --- | --- |
| Domain Name | IP Address | Server Name |
| www.abc.com | 192.168.0.120 | 120 |
| www.abc.com | 192.168.0.130 | 130 |
| www.abc.com | 192.168.0.140 | 140 |
| www.yxz.com | 192.168.0.710 | 710 |
| www.yxz.com | 192.168.0.720 | 720 |
| www.yxz.com | 192.168.0.730 | 730 |

Fig. 3

IDENTITY-BASED CASTING OF NETWORK ADDRESSES

BACKGROUND

Online entities offer a wide variety of services to a variety of different client devices, including personal computers (PCs), portable digital assistants (PDAs), mobile telephones, pocket PCs, smartphones, set-top boxes, digital video recorders (DVRs), and gaming consoles, among other possibilities. These client devices often access various web services, such as online stores or other providers of audio/visual content, software programs, digital books, or other electronic content. In many cases, users of a client device may use a domain name to identify a web service.

However, generally speaking, client devices cannot translate domain names directly into network addresses, such as internet protocol ("IP") addresses. Rather, client devices typically send the domain name of a web service to a domain name system ("DNS") server, and the DNS server replies to the client device with one or more IP addresses for accessing the web service. The client device may then use one of the IP addresses that it received from the DNS server to access one or more servers associated with the web service.

In some cases, the web service may select one of the servers to provide the web service to the client device, and the selected server may also maintain state information for the client device and the current browsing or connection session. For example, a user of the client device may add items to an online shopping cart, and the selected server may store state data identifying the items that the user has added to the shopping cart. However, because the client device may access the web service at a domain name that is used by all of the servers associated with the web service, the web service may need logic to route communications to the specific IP address for the server that will provide the selected web service to the client device. Moreover, because the selected server may fail, the web service may also need to replicate the state data on the other servers associated with the domain name. In some cases, the client device is also required to store state data, such as a cookie, that identifies the client device's current state to the web service. Therefore, systems and methods are needed to overcome these limitations of traditional methods for selecting servers for providing a web service to a client device.

BRIEF DESCRIPTION OF THE DRAWINGS

The accompanying drawings, which are incorporated in and constitute a part of this disclosure, illustrate various disclosed embodiments. In the drawings:

FIG. 3 is a diagram of an example of an IP address table;

DETAILED DESCRIPTION

Figure 1:
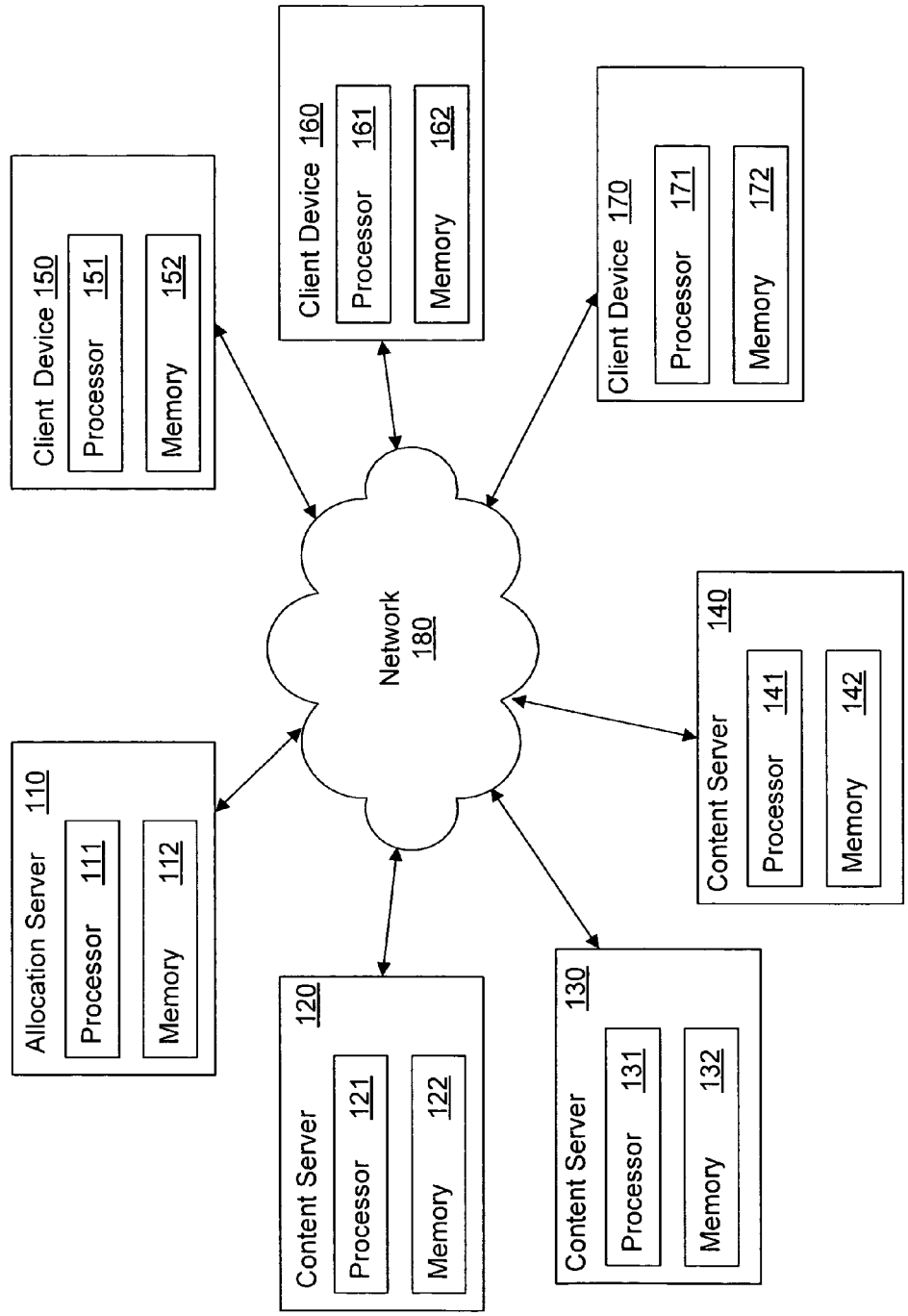
FIG. 1 is a diagram of an example of a system for providing access to a service.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, deleting, or adding steps to the disclosed methods. Accordingly, the following detailed description is not limiting of the disclosed embodiments. Instead, the proper scope is defined by the appended claims.

Disclosed embodiments provide systems and methods for identifying a server, such as a server that provides a web service, to a client. The systems and methods may store server identification data for several servers associated with a domain name. Client devices may send requests to access the domain name, along with identifiers of the client devices. The client devices may be provided with IP addresses for accessing the web service, and the IP address provided to each respective client may be based on the client device's identifier.

Consistent with a disclosed embodiment, a computer-implemented method identifies a server to a client. According to the method, server identification data is stored for a plurality of servers associated with a domain name, and the plurality of servers includes a first server and a second server. A first request is received from a first client device, and the first request includes an identifier of the first client device. A second request is received from a second client device, and the second request includes an identifier of the second client device. The first server is selected to process the first request, and the first server is selected based on at least the identifier of the first client device. The second server is selected to process the second request, and the second server is selected based on at least the identifier of the second client device. The server identification data for the first server is provided to the first client device, and the server identification data for the second server is provided to the second client device. The first server processes the first request consistent with first state data stored at the first server, and the first state data corresponds to the first client device. The second server processes the second request consistent with second state data stored at the second server, and the second state data corresponds to the second client device.

Consistent with another disclosed embodiment, a computer-implemented method identifies a server. According to the method, server identification data is stored for a plurality of servers associated with a service. An identifier of a client device is received, and one of the plurality of servers is selected to provide the service to the client device. The server is selected based at least on the identifier of the client device. The server identification data for the selected server is provided to the client device. The selected server receives a request to access the service from the client device, and processes the request consistent with state data stored at the selected server.

Consistent with another disclosed embodiment, a system provides access to a service. The system includes a processor for executing program instructions, and a non-transitory computer-readable medium storing the program instructions. The program instructions, when executed by the processor, performing a process store server identification data for a plurality of servers associated with a service. The program instructions receive an identifier of a client device, and select one of the plurality of servers to provide the service to the client device. The program instructions select the server based on the identifier of the client device; and the server identification data for the selected server is provided to the client device. The selected server receives a request to access the service from the client device, and processes the request consistent with state data stored at the selected server.

Consistent with yet another embodiment, a client device includes a processor for executing program instructions, and a non-transitory computer-readable storage medium storing the program instructions. The program instructions, when executed by the processor, perform a process to request a service. The process includes transmitting a domain name to a first server, and receiving, from the first server, identification data of a second server. The process further includes transmitting identification data of the client device to the second server, receiving, from the second server, identification data of a third server, and requesting the service from the third server.

Consistent with other disclosed embodiments, a non-transitory computer-readable storage medium may store program instructions for implementing any of the methods described herein.

FIG. 1 is an example of a system 100 for identifying a server to a client, consistent with one or more embodiments. System 100 may also provide functionality for one or more client devices to access a service (e.g., a web service) executing on a web server. As shown in system 100, allocation server 110, content servers 120, 130, and 140, and client devices 150, 160, and 170 are connected to a network 180. One of skill in the art will appreciate that although a particular number of components are depicted in FIG. 1, any number of these components may be provided. One of ordinary skill in the art will also recognize that functions provided by one or more components of system 100 may be combined into one component, or distributed across a plurality of components. For example, allocation server 110 and content servers 120, 130, and 140 may be implemented using one or more server farms including several main servers as well as several backup servers. In addition, allocation server 110 and content servers 120, 130, and 140 may be implemented by distributing various processing steps discussed herein across multiple servers.

Network 180 provides communications between the various components in system 100, such as allocation server 110, content servers 120, 130, and 140, and client device 150, 160, and 170. Network 180 may be a shared, public, or private network, may encompass a wide area or local area, and may be implemented through any suitable combination of wired and/or wireless communication networks. Furthermore, network 180 may comprise an intranet or the Internet.

Allocation server 110 may comprise a general purpose computer (e.g., a personal computer, network computer, server, or mainframe computer) having one or more processors that may be selectively activated or reconfigured by a computer program. Processor 111 may perform steps or methods consistent with disclosed embodiments by reading instructions from memory 112, and executing the instructions. As discussed in more detail below, certain components of allocation server 110 may be implemented as instructions stored in memory 112, suitable for execution by processor 111.

Memory 112 may be one or more memory or storage devices that store data as well as software. Memory 112 may also comprise, for example, one or more of RAM, ROM, magnetic storage, or optical storage. Furthermore, memory 112 may store program modules that, when executed by processor 111, perform one or more steps discussed below.

In other embodiments, allocation server 110 may be specially constructed for carrying-out methods consistent with disclosed embodiments. For example, one or more of the processing steps disclosed herein may be implemented on a field-programmable gate array ("FPGA"), application-specific integrated circuit ("ASIC") or suitable chipset. Content servers 120, 130, and 140 may be similar in construction to allocation server 110.

Content servers 120, 130, and 140 may be associated with a domain name, such as www.abc.com. Content servers 120, 130, and 140 may provide access to one or more services, such as web services, associated with the domain name. Client devices 150, 160, and 170 may access the services associated with the domain name by providing the domain name and a client device identifier to allocation server 110. Allocation server 110 may provide identification data for one or more of content servers 120, 130, and 140 to client devices 150, 160, and 170. Thereafter, client devices 150, 160, and 170 may access the web services by directly communicating with content servers 150, 160, and 170 using the identification data received from allocation server 110.

Allocation server 110 may determine which of content servers 120, 130, and 140 provides the requested service to the requesting client device based on the identifier of the client device. When allocation server 110 receives the domain name and client identifier from one of client devices 150, 160, and 170, allocation server 110 may select one of content servers 120, 130, or 140 to provide the service associated with the domain name to the requesting client device. Allocation server 110 may also provide server identification data, such as the IP address of the selected content server, to the requesting client device.

As discussed, content servers 120, 130, and 140 may be similar in construction to allocation server 110. For example, content servers 120, 130, and 140 may comprise one or more general purpose computers (e.g., a personal computer, network computer, server, or mainframe computer) having one or more processors 121, 131, and 141 that may be selectively activated or reconfigured by a computer program. Furthermore, content servers 120, 130, and 140 may communicate via network 180 with allocation server 110 as well as client devices 150, 160, and 170. Content servers 120, 130, and 140 may be implemented using server farms, distributed technologies, and various combinations of software and hardware in a manner analogous to the discussion above with respect to allocation server 110. Content servers 120, 130, and 140 may also include one or more memories 122, 132, and 142, comprising instructions executable by processors 121, 131, and 141, respectively.

Client devices 150, 160, and 170 may be any type of device for communicating with allocation server 110 and content servers 120, 130, and 140. For example, client devices 150, 160, and 170 may be personal computers, handheld devices (e.g., PDAs, cellular phones such as a smartphones, etc.), televisions, digital music players, set-top boxes, digital video recorders (DVRs), or gaming consoles, or any other appropriate computing platforms or devices capable of exchanging data with network 180. Client devices 150, 160, and 170 may include, for example, processors 151, 161, and 171, and memories 152, 162, and 172, respectively.

Figure 2A:
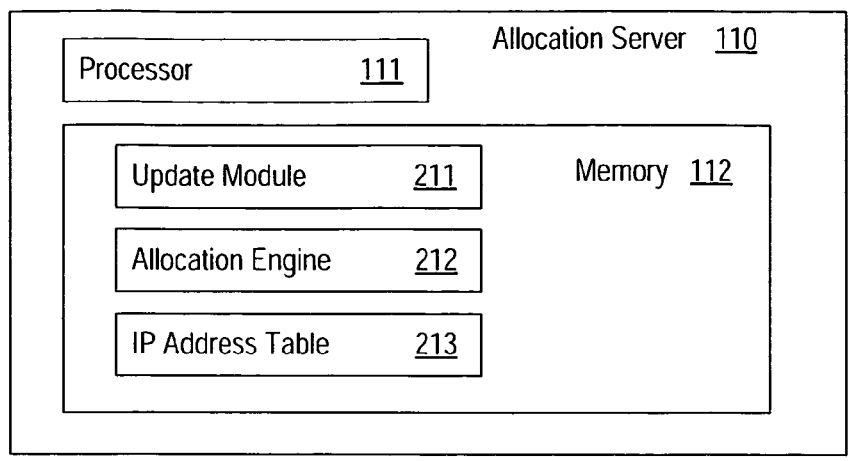
FIG. 2A is diagram of an example of an architecture of an allocation server.

FIG. 2A shows a diagram of an example of an architecture of allocation server 110, in accordance with one or more embodiments. As discussed above, memory 112 in allocation server 110 may provide server identification data, such as an IP address, to a requesting client device. The server identification data may be stored in IP address table 213. Allocation server 110 may also include an update module 211 for updating IP address table 213 with new IP addresses for content servers 120, 130, and 140, and for adding or deleting content servers from IP address table 213. Allocation server 110 may also include an allocation engine 212 for selecting a particular one of content servers 120, 130, and 140 to process requests from client devices 150, 160, and 170.

Figure 2B:
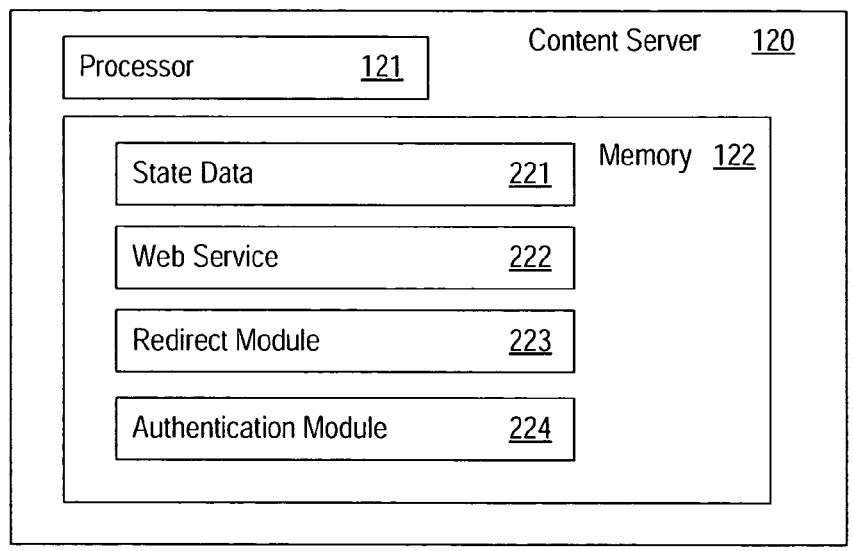
FIG. 2B an example of an architecture of a server.

FIG. 2B shows a diagram of an example of an architecture of content server 120, in accordance with one or more embodiments. Content servers 130 and 140 may have similar architectures to that shown in FIG. 2B. Memory 122 in content server 120 may store a service, such as web service 122, which is associated with a domain name, and client devices that access the domain name may be provided with the service. Memory 122 may also include state data 221. For example, state data 221 may include shopping cart data that reflects the current state of one or more client devices 150, 160, and 170. For example, if client device 150 is communicating with content server 120 to add items to a shopping cart, state data 221 may identify the items added to the shopping cart. Memory 122 may also include a redirect module 223 for redirecting requests from one of client devices 150, 160, and 170 to another one of content servers 120 or 130 that also has state data for the corresponding client device. Memory 122 may also include an authentication module 224 for authenticating requests from client devices 150, 160, and 170, using techniques such as username/password combinations or security tokens.

Figure 2C:
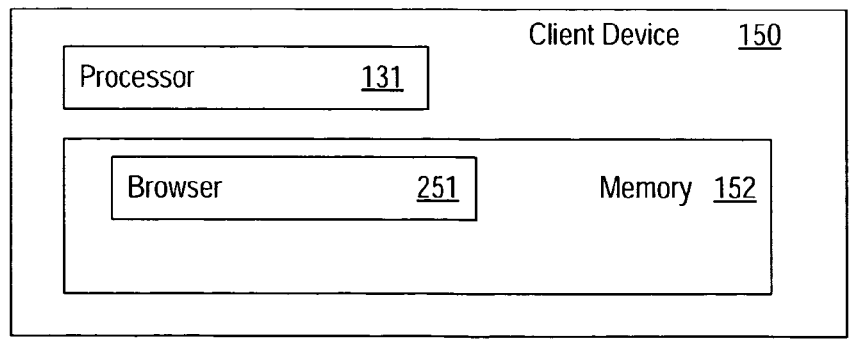
FIG. 2C is an example of an architecture of a client device.

FIG. 2C shows a diagram of an example of an architecture of client device 150, in accordance with one or more embodiments. Client devices 160 and 170 may have similar architectures to that shown in FIG. 2C. Memory 152 in client device 150 may include an application for accessing services, such as browser 251. Browser 251 may access the services by providing an associated domain name and a client device identifier to allocation server 110, receiving server identification data from allocation server 110, and accessing the content server corresponding to the received server identification data.

FIG. 3 illustrates an exemplary diagram of IP address table 213, consistent with disclosed embodiments. IP address table 213 may include one or more domain names that are associated with services, such as web services. For example, a first web service (or group of web services) may be provided by the domain www.abc.com, and a second web service (or group of web services) may be provided by the domain name www.xyz.com. As shown in FIG. 3, content servers 120, 130, and 140 may be associated with domain name www.abc.com, and provide associated web service(s). Content servers 710, 720, and 730 (not shown) may be associated with the domain name www.xyz.com, and provide associated web service(s).

IP address table 213 may also include server identification data, such as IP addresses, for each content server listed therein. For example, content server 120 may have an IP address of 192.168.0.120, content server 130 may have an IP address of 192.168.0.130, and content server 140 may have an IP address of 192.168.0.140. In operation, allocation server 110 may access IP address table 213 to determine the IP address of a content server selected to respond to requests from one of client devices 150, 160, or 170. If an IP address of one of content servers 120, 130, or 140 changes, update module 211 may update IP address table 213 to reflect the modified IP address. Furthermore, if a new content server is associated with the domain name, or an existing content server is no longer to be associated with the domain name, update module 211 may update IP address table 213 accordingly.

Figure 4:
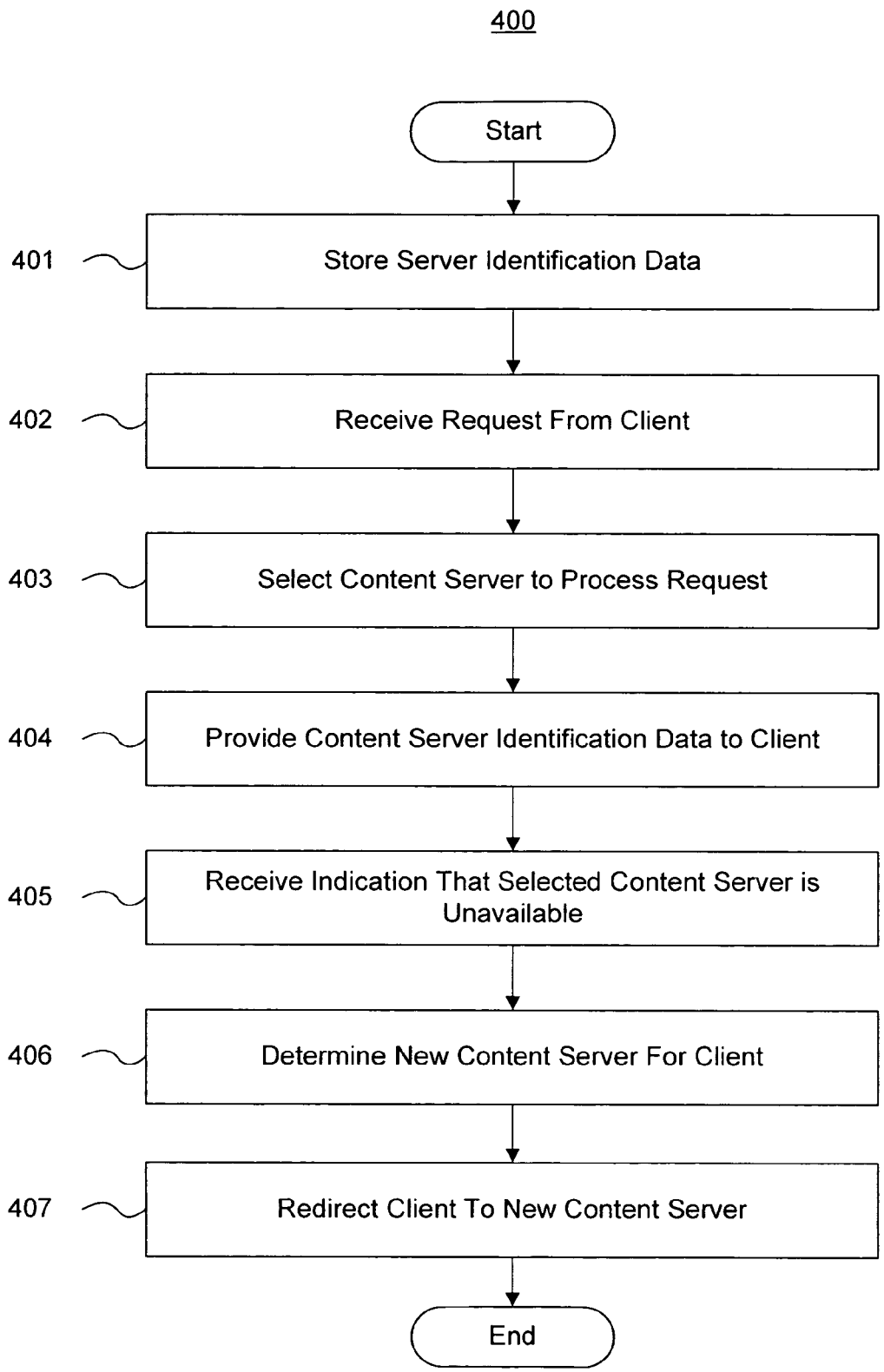
FIG. 4 is a flow diagram of an example of a routine for identifying a server to a client.

FIG. 4 is a flow diagram of an example of a routine 400 for identifying a server to a client, consistent with one or more disclosed embodiments. Routine 400 may be implemented by allocation engine 212 of allocation server 110, using processes according to one or more of program modules stored in memory 112.

At the start of routine 400, in block 401, allocation server 110 may store server identification data for one or more content servers. For example, allocation server 110 may store IP address table 213, and corresponding IP addresses for content servers 120, 130, and 140. In some embodiments, allocation server 110 may also store a domain name that is associated with the IP address, e.g., www.abc.com. In further embodiments, more than one domain name may be associated with a given IP address. For example, the domain name www.abcd.com may also be associated with one or more of IP addresses 192.168.0.120, 192.168.0.130, and 192.168.0.140, and corresponding content servers 120, 130, and 140.

Next; in block 402, allocation server 110 may receive a request from a client device for accessing a domain name. For example, allocation server 110 may receive a request from client device 150, e.g., to request access to www.abc.com. The request may also include client identification data that identifies client device 150 to allocation server 110. For example, the client identification data may be a number or numbers unique to client device 150, such as an IP or media access control ("MAC") address. Alternatively, the client identification data may be a serial number for the client device, or a combination of a device type identifier and the serial number. In some embodiments, the client identification data may be appended to the domain name as a prefix, e.g., "client_device_150.abc.com" or "client_device_150.www.abc.com."

Next, in block 403, allocation server 110 may select a content server to process requests from the client device. For example, content servers 120, 130, and 140 are all associated with the domain name www.abc.com, and each of these content servers may be capable of processing requests from client device 150 to access www.abc.com. However, allocation server 110 may select content server 120, instead of content servers 130 or 140, to process requests from client device 150. In some embodiments, allocation server 110 may maintain a table identifying which of content servers 120, 130, and 140 are assigned to process requests from each client device 150, 160, and 170.

In further embodiments, allocation server 110 may use a mathematical technique, rather than a table, to select the particular content server to process requests from client device 150. For example, a mathematical function, such as a hash function, may use the client identification data as an input, and the selected content server as an output. In some embodiments, the hash function is a consistent hashing algorithm, as discussed in more detail below, with respect to FIGS. 5 and 6.

Next, in block 404, allocation server 110 may provide server identification data to the client. The server identification data may be a number or numbers unique to the content server selected at block 403, e.g., server 120. For example, the server identification data may be a MAC address, or an IP address from IP address table 213. As shown in FIG. 3, allocation server 110 may use the IP address 192.168.0.120 as the server identification data for server 120. Allocation server 110 may provide the IP address 192.168.0.120 to client device 150 by transmitting the IP address to client device 150 over network 180.

Once client device 150 has received the IP address of server 120, client device 150 may transmit one or more requests to content server 120 over network 180 to access the domain name www.abc.com. Because client device 150 has received the IP address for its assigned content server, e.g., content server 120, client device 150 may access web service 222 by communicating directly with content server 120. Thus, client device 150 may access web service 222 without further communicating with allocation server 110.

While providing web service 222 to client device 150, content server 120 may also store state data 221 that represents the state of communications with client device 150. State data 221 may correspond to a browsing or connection session between client device 150 and server 120. For example, in embodiments where web service 122 is a shopping service, state data 221 may relate to a shopping cart, and may track items added by client device 150 to the shopping cart. In other embodiments, state data 221 may identify certain data items, such as musical selections, electronic books, videos, or other electronic media, that have been sent to client device 150, for example by including identifiers of the electronic media data items.

State data 221 may also identify other data, such as data provided by client device 150 to complete fields of a form. State data 221 may also include characteristics or properties of client device 150 such as the geo-location of the device. State data 221 may also include information that content server 120 has derived and/or retrieved on the behalf of client device 150, such as local weather or news. State data 221 may also include information needed to manage the browsing or connection session, such as the accumulated bandwidth usage of the client device.

Next, in block 405, allocation server 110 may receive an indication that a particular content server is unavailable. For example, content server 120 may fail, and content server 130 may determine that content server 120 has failed by monitoring server 120. For example, content server 130 may periodically communicate with content server 120, and may determine that content server 120 has failed because content server 120 has not communicated with content server 130 within a predetermined timeout period, e.g., 30 seconds. Content server 130 may implement the monitoring mechanism using a technique such as a ping command. When content server 120 has not responded to communications from content server 130 within the predetermined timeout period, content server 130 may transmit an indication to allocation server 110 that content server 120 has failed.

Next, in block 406, allocation server 110 may determine a new content server to process requests for the domain name from client device 150. For example, allocation server 110 may identify a particular content server, such as content server 140, that should process subsequent requests from client device 150. In further embodiments, mathematical techniques, such as the consistent hashing algorithm discussed below, may be used by allocation server 110 to determine which content server should be assigned to client device 150 when content server 120 fails.

Next, in block 407, redirect module 223 on allocation server 110 may redirect client device 150 to the content server that was determined at block 406. For example, allocation server 110 may transmit a message to client device 150 that identifies content server 140 as the new content server to which client device 150 should direct requests for the domain name www.abc.com. Allocation server 110 may do so by transmitting the IP address for content server 140, e.g., 192.168.0.140, to client device 150. In some embodiments, allocation server 110 may wait for client device 150 to send another request for www.abc.com before transmitting the IP address for content server 140 to client device 150.

Using method 400, as described above, allocation server 110 may select the content server that should process requests for a given domain name from a particular client device. Because each client device has a particular assigned content server to process the requests for the domain name, requests from each client device for the domain name may be transmitted directly to the appropriate IP address for the assigned content server. As discussed above, this technique may be implemented by using client identification data as an input to a mathematical function.

In some embodiments, allocation server 110 may be a domain name system ("DNS") server. In such embodiments, the DNS server may be modified to implement the mathematical techniques discussed herein to select the particular content server to respond to requests from client devices for particular domain names, based on identifiers of the client devices. When allocation server 110 is implemented as a DNS server, client device 150 may provide both the client identification data and the domain name to allocation server 110 when making the initial request to access web service 222, e.g., at block 402 of routine 400. Allocation server 110 may then determine which of content servers 120, 130, and 140 should receive subsequent requests from client device 150.

In further embodiments, allocation server 110 may be implemented separately from a DNS server. In such embodiments, allocation server 110 may be associated with the domain name, for example, as part of a group of content servers that also includes content servers 120, 130, and 140. Client devices 150, 160, and 170 may initially request to access the domain name by contacting the DNS server to obtain an IP address for the domain name, e.g., the IP address of allocation server 110.

Using the IP address from the DNS server, the client devices may then contact allocation server 110, which responds to the client devices with the appropriate IP addresses for their assigned content servers. Thus, the DNS server may initially provide a common IP address for the client devices to access the web services, e.g., the IP address for allocation server 110. After allocation server 110 provides each client device with the IP address for their respective content servers, the client devices may send subsequent requests for the web services directly to the IP address for their respective assigned content servers.

In still further embodiments, the DNS server may store a list of IP addresses that may be used to access the web services, randomly select one or more IP addresses from the list upon receiving a request for the domain, and provide the list to the client device upon receiving an initial request to access the web services. In such embodiments, each IP address on the list may correspond to a different allocation server. Client devices may contact one or more of the IP addresses on the list to obtain, from the corresponding allocation server, the IP address for their assigned server, and may send subsequent requests to access the web services to the IP address for their assigned content server.

In embodiments where allocation server 110 is implemented separately from a DNS server, client devices 150, 160, and 170 may provide the domain name and client identification data separately. For example, client devices 150, 160, and 170 may provide only the domain name, without the client identification data, to the DNS server, and receive an IP address for allocation server 110 in response. Subsequently, client devices 150, 160, and 170 may transmit their respective client identification data to allocation server 110. As discussed above with respect to blocks 403 and 404 of routine 400, allocation server 110 may then determine the assigned content server for the client device based on the identification data, and provide the IP address for the assigned content server to the requesting client device.

In some embodiments, client devices 150, 160, and 170 may include and execute logic for requesting web service 222 using different techniques, depending on whether allocation server 110 is implemented as on a DNS server, or implemented separately. When allocation server 110 is implemented on a DNS server, client devices 150, 160, and 170 may provide their respective client identification data together with the domain name in a single request for web service 222. In return, allocation server 110 may provide the IP address for the assigned content server.

However, when allocation server 110 is implemented separately from the DNS server, client devices 150, 160, and 170 may provide the domain name and client identification data separately, as part of a two-step process. First, client devices 150, 160, and 170 may transmit the requested domain name to the DNS server, and in response, receive the IP address for allocation server 110. Then, client devices 150, 160, and 170 may transmit their respective client identification data to the IP address received from the DNS server, e.g., the IP address of allocation server 110. Then, client devices 150, 160, and 170 may receive the IP address of their assigned content server from allocation server 110, and access web service 222 at the respective IP addresses, e.g., the IP addresses for content servers 120, 130, and 140.

In still further embodiments, the functionality discussed above for allocation server 110 may be implemented on content servers 120, 130, and/or 140. In such embodiments, content servers 120, 130, and 140 may be capable of both implementing method 400 to identify a server to a client device, and of providing one or more services associated with the requested domain name. In such embodiments, the server that selects and identifies a content server for a particular client device is not necessarily the content server that provides the service to the particular client device.

As discussed above, each content server may store state data corresponding to communications between the client devices and their respective assigned servers. However, if a given content server fails, the state data may be lost. For example, if content server 120 is assigned to client device 150, and stores state data for shopping cart items selected by the user of client device 150, content server 130 or 140 may continue providing the shopping service to client device 150. However, when content server 120 fails (e.g., experiences a crash), the state data identifying the shopping cart items may be lost. To overcome this problem, the state data for a given client device may be replicated on content server 130 or 140, to ensure that if content server 120 fails, the shopping cart items are recoverable.

In some embodiments, the content server that replicates the state data may be the server that is responsible for providing the web service if the assigned server fails. Thus, content server 130 may be assigned as a backup server for server 120, and may receive the state data from content server 120 whenever modifications to the state data are requested. In the event of a failure by content server 120, server 130 may transmit a message to allocation server 110 indicating that content server 130 is now responsible for providing the web service to client device 150, and allocation server 110 may provide client device 150 with the IP address for content server 130. Alternatively, content server 130 may directly transmit the IP address to client device 150. Upon determining that content server 120 has failed, content server 130 may take over and provide the web service, and provide the state data for client device 150 to content server 140, so that content server 140 may replicate the state data in the event that content server 130 also crashes.

In further embodiments, the content server that replicates the state data is not necessarily the content server that is responsible for providing the web service in the event that a content server fails. For example, content server 130 may be responsible for replicating state data for both content servers 120 and 140, but content server 140 may be responsible for providing the web service to client device 150 in the event that content server 120 fails. Thus, in the event of a failure by content server 120, content server 140 may obtain the replicated state data from content server 130, rather than maintaining the replicated state data locally while content server 120 is still operational.

In still further embodiments, state data may be replicated by using a dedicated backup server for each content server. In such embodiments, the dedicated backup servers may be included in system 100 in a one-to-one relationship with each content server. Upon a failure by any of content servers 120, 130, or 140, the corresponding backup server may take over providing the web service to the client devices that were assigned to the failed content server. In such an embodiment, allocation server 110 or the backup servers may be responsible for providing the IP address of the assigned backup server to the corresponding client devices.

As discussed above, client devices 150, 160, and 170 may provide client identification data to allocation server 110, which allocation server 110 may use to determine which content server should be assigned to the requesting client device. In further embodiments, other information may be provided by the requesting client device. For example, client devices 150, 160, or 170 may provide location information instead of, or in addition to, the client identification data.

For example, client device 150 may be located in Europe, and client device 160 may be located in Asia. Content server 120 may be responsible for providing web service 222 to client devices in Europe, and content server 130 may be responsible for providing web service 222 to client devices in Asia. Client device 150 may send location information, such as the text string "Europe" or other identifier to allocation server 110 when requesting web service 222. Likewise, client device 160 may provide the text string "Asia" to allocation server 110 when requesting web service 222. Client devices 150 and 160 may provide the text strings as prefixes to the URL www.abc.com, e.g., by transmitting "Europe_www.abc.com" and "Asia_www.abc.com," respectively. Upon receiving the requests, allocation server 110 may determine that content server 120 is assigned to client device 150, and content server 130 is assigned to client device 160. Allocation server 110 may then provide the appropriate IP addresses for content servers 120 and 130 to client devices 150 and 160, respectively.

In still further embodiments, requesting client devices may provide information such as device types to allocation server 110. For example, content server 120 may be responsible for providing web service 222 to a device type "A," whereas content server 130 may be responsible for providing web service 222 to a device type "B." This may be useful, for example, where device type "A" supports certain features that are not supported by device type "B," and content server 120 provides server-side support for such features, but not content server 130.

In such embodiments, client devices 150 and 160 may provide their respective device types in a text string with the URL, e.g., "typeA_www.abc.com" and "typeB_www.abc.com," respectively. Allocation server 110 may then determine the appropriate IP addresses to transmit in response, e.g., the IP address for content server 120 may be transmitted to client device 150, and the IP address for content server 130 may be transmitted to client device 160.

Figure 5:
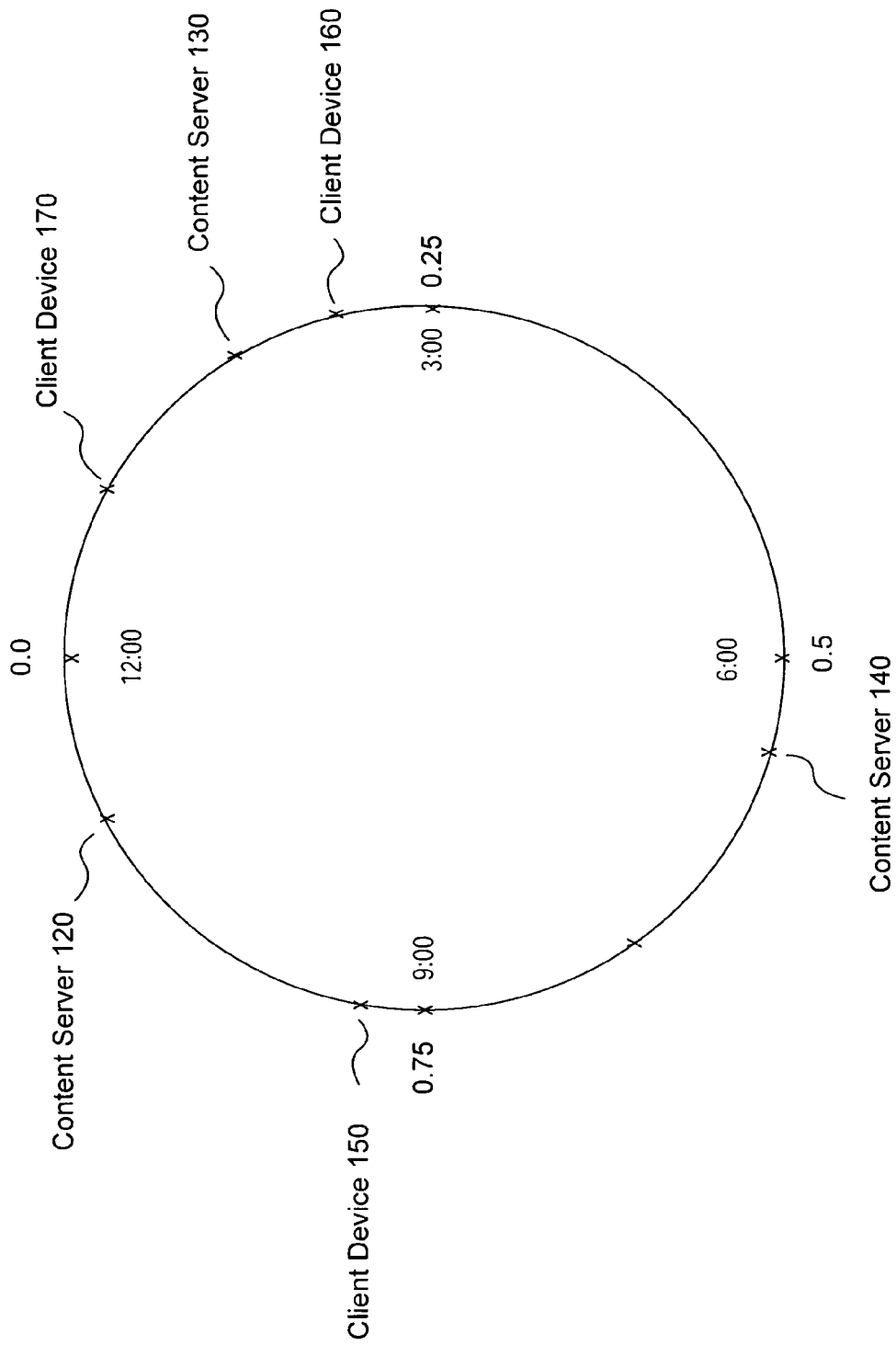
FIG. 5 is an illustration of an exemplary consistent hashing routine.

FIG. 5 is a conceptual diagram of an exemplary consistent hashing technique, in accordance with disclosed embodiments. As discussed above, identifiers of client devices 150, 160, and 170 may be input to a consistent hashing algorithm, and the algorithm may output the content server that is assigned to each respective client device. The consistent hashing algorithm may map the identifiers of each client device to locations on a circle, as well as map identifiers of each content server to locations on a circle. The assigned server for a given client device may be determined by moving counterclockwise or clockwise on the circle from the mapped location of a client device to the closest mapped location of a content server.

For example, as can be seen from FIG. 5, client device 150 is mapped to a location at approximately 9:30 on a circle. Moving clockwise, the closest content server is content server 120, which is mapped to a location at approximately 11:00 on the circle. Thus, content server 120 is the assigned content server for client device 150. Likewise, client 170 is mapped to a location at approximately 1:00 on the circle. Moving clockwise, content server 130, mapped to approximately 2:00 on the circle, is the closest content server to client 170 and, therefore, is the assigned content server for client 170. Similarly, content server 140 is the assigned server for client device 160, as can be seen from FIG. 5. Additional details of the consistent hashing algorithm are discussed below.

Figure 6:
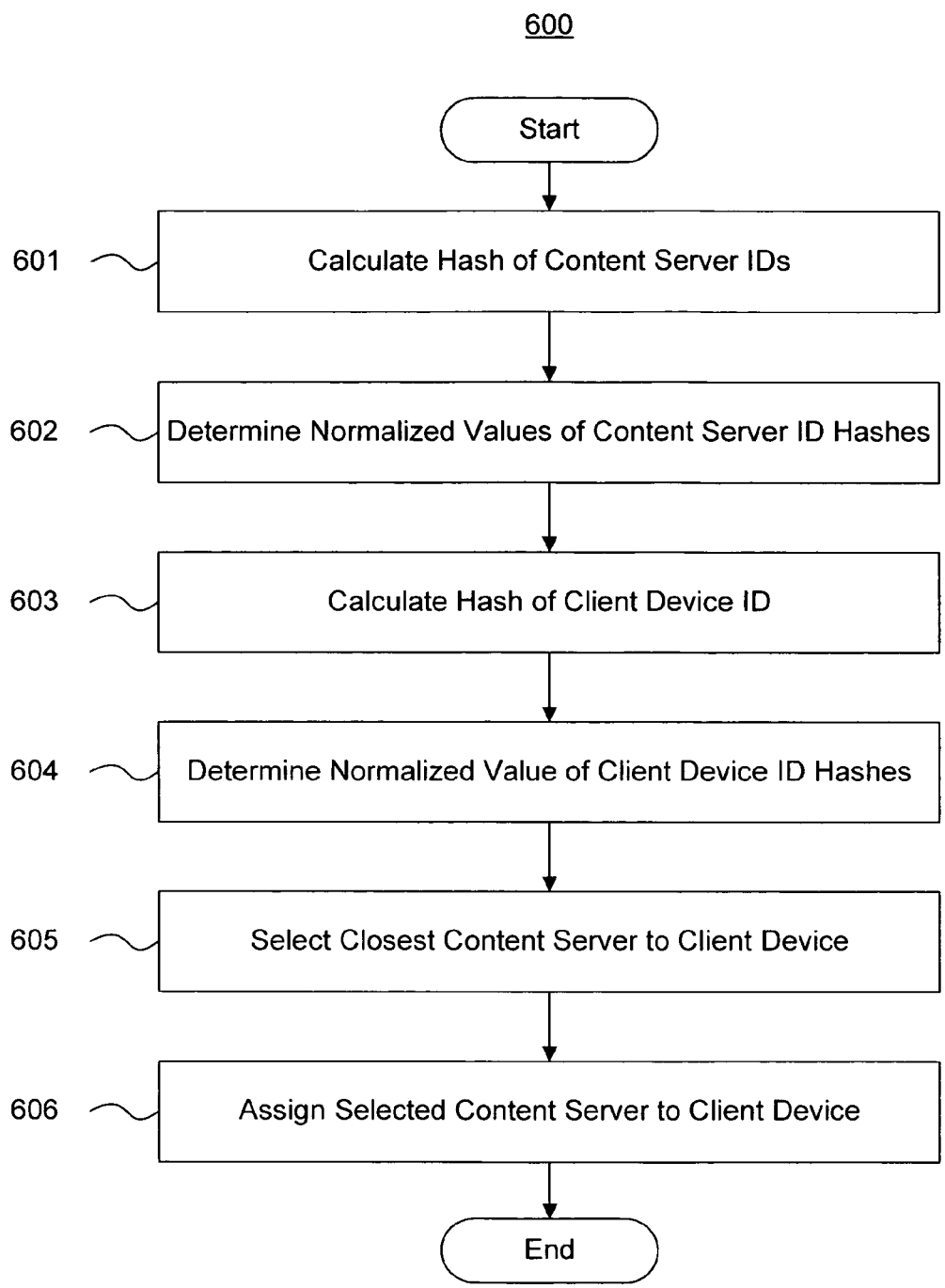
FIG. 6 is a flow diagram of a routine for assigning a server to a client.

FIG. 6 is a flow diagram of an example of a routine 600 for selecting servers to process requests from a client device, consistent with one or more disclosed embodiments. Routine 600 may be implemented by allocation engine 212 on allocation server 110, using processes according to one or more of program modules stored in memory 112. Block 403 of method 400 may be implemented using method 600 to select the content server to process requests for a client device accessing a domain name.

Routine 600 begins at block 601, where allocation server 110 may use a hash function to calculate a hash value based on identifiers for content servers 120, 130, and 140. For example, the identifiers may be IP addresses, MAC addresses, or other identifiers of servers 120, 130, and 140. In some embodiments, the content server identifiers are unique to each corresponding server. The hash function may be MD5, SHA-1, or any other suitable hash function.

Next, in block 602, allocation server 110 may determine corresponding values, for example, between 0 and 1, of the hash values calculated at block 601. For example, the hash values may be normalized to the range between 0 and 1, and mapped to corresponding locations on a circle, as shown in FIG. 5. For example, a hash value of 0 is mapped to the 12:00 position, a hash value of 0.5 is mapped to the 6:00 position, etc.

Blocks 601 and 602 may be implemented by allocation server 110 before receiving requests from client devices to access a domain name or, alternatively, may be implemented upon receiving requests from the client devices. In some embodiments, each time a server is added that is associated with the domain name, blocks 601 and 602 are performed to map the new content server to the circle shown in FIG. 5. Likewise, when allocation server 110 receives an indication that a given content server is no longer available, the corresponding mappings on the circle may be deleted.

Next, in block 603, allocation server 110 may use the hash function of block 601 to also calculate hash values based on identifiers of client devices 150, 160, and 170. For example, the identifiers may be IP or MAC addresses for the client devices, or other suitable identifiers. In some embodiments, the identifiers are unique to each corresponding client device. The hash function used at block 603 is not necessarily identical to the hash function used at block 601. For example, if the values calculated at block 603 can be normalized and mapped to the circle shown in FIG. 5, a different hash function may be used in block 603 than is used in block 601.

Next, in block 604, allocation server 110 may determine corresponding values, for example, between 0 and 1, of the hash values calculated at block 601. For example, the hash values are normalized to the range between 0 and 1, and mapped to corresponding locations on a circle, as shown in FIG. 5. For example, a hash value of 0 is mapped to the 12:00 position, a hash value of 0.5 is mapped to the 6:00 position, etc.

In some embodiments, blocks 603 and 604 are implemented by allocation server 110 upon first receiving a request from a given client device to access the domain name. However, allocation server 110 may also maintain the mapping of a given client device on the circle, even after the client device closes a browsing session with the web service. In some embodiments, the mappings are automatically deleted after a predetermined amount of time from receiving the client device requests. In other embodiments, content servers 120, 130, and/or 140 may transmit messages to allocation server 110 indicating that a browsing session for a given client device has ended, and the corresponding mapping for the client device should be deleted.

Next, in block 605, allocation server 110 may select the content server with the closest value to the client requesting to access the domain name. Allocation server 110 may do so, for example, by moving in the clockwise or counterclockwise direction on the circle shown in FIG. 5. For example, the hash value of the identifier for client device 150 may be normalized to approximately 0.8. To determine the closest normalized server value in the clockwise direction from client 150, allocation server may find the closest normalized server value that is higher than 0.8. As shown in FIG. 5, the hash value of the identifier for content server 120 may be normalized to approximately 0.9, and therefore content server 120 is selected for processing requests from client device 150.

Next, in block 606, allocation server 110 may assign the content server selected at block 605 to the requesting client device. For example, allocation server 110 may store data, e.g., a table, indicating a correspondence between client device 150 and content server 120. In some embodiments, allocation server 110 may also transmit a message to content server 120 indicating that content server 120 is assigned to process requests for www.abc.com from client device 150. Likewise, allocation server 110 may transmit a message to client device 150 indicating that content server 120 is the assigned server.

As discussed above with respect to routine 400, content servers may be added or removed by allocation server 110. For example, a content server may be removed from being an available server when allocation server 110 receives a message indicating that the content server has failed. Likewise, a content server may be removed even though the content server has not failed, for example, if an entity associated with the domain name decides that the content server should no longer be associated with the domain name.

In the case where a content server is removed, allocation server 110 may remove the corresponding mapped locations from the circle. For example, if allocation server 110 receives a message indicating that content server 120 is no longer available to provide access to the domain name, allocation server may remove the corresponding mapped location on the circle shown in FIG. 5. Note that, in such a case, the closest content server in the clockwise direction from client device 150 is now content server 130. Thus, allocation server 110 may assign content server 130 to client device 150, for example, by transmitting a message with the IP address of content server 130 to client device 150. In further embodiments, the removed content server, or the newly-assigned content server, may provide the IP address for the newly-assigned content server to the client device.

In the embodiments discussed above, the closest content server in the clockwise direction was determined mathematically, by finding the next-highest normalized server hash value relative to the normalized hash value for client device 150. However, as can be seen from FIG. 5, if content server 120 is no longer available to process requests for the domain name, no content server has a higher normalized hash value than the value of approximately 0.8 for client device 150.

From FIG. 5, it is apparent that the next content server in the clockwise direction from client device 150 is content server 130. However, the normalized hash value for content server 130 is approximately 0.2, a lower value than the normalized hash value for client device 150 of approximately 0.8. To account for this situation and correctly identify server 130, allocation server 110 may include suitable program logic to select the content server with the lowest normalized hash value, when there is no server with a higher normalized hash value.

Using the consistent hashing technique discussed above, it is possible to determine which content server will be assigned to a given client device in the event of a failure by the currently-assigned content server. For example, referring to FIG. 5, while content server 120 is assigned to client device 150, it is apparent that a failure by content server 120 will result in content server 130 being the assigned server for client device 150. In such embodiments, content server 130 may be responsible for replicating state data 221 while content server 120 is assigned to client device 150. Thus, in the event of a failure by content server 120, content server 130 will have a locally-stored copy of state data 221, and thus may be able to continue providing web service 222 to client device 150. From the perspective of client device 150, this may prevent an interruption in service that requires the user of client device 150 to repeat certain actions that would be required if the state data were not available on content server 130.

Furthermore, using the consistent hashing technique discussed above, a load-balancing effect may be achieved. Provided the hashing algorithm values for the client device and content server identification data are normalized to a uniform distribution between 0.0 and 1.0, the number of client devices assigned to each content server will, on average, be approximately equal. Moreover, in circumstances where a content server fails, the consistent hashing technique reduces the number of client devices that must be assigned to new content servers, relative to conventional hashing algorithms.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, C#, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for identifying a server to a client, comprising:

storing, at an allocation server, a first set of server identification data for a plurality of content servers associated with a domain name, the plurality of content servers including at least a first content server and a second content server, wherein the allocation server is configured to store server identification data for multiple pluralities of content servers, each plurality of content servers associated with a different domain name;

receiving, at the allocation server, a first request to access one of the plurality of content servers associated with the domain name from a first client device, the first request including an identifier of the first client device;

receiving, at the allocation server, a second request to access one of the plurality of content servers associated with the domain name from a second client device, the second request including an identifier of the second client device;

selecting the first content server to process the first request, wherein the first content server is selected based on at least the identifier of the first client device and the domain name, and the proximity of a location of a hash value for the first client device on a circle to a location of a hash value for the first content server on the circle, and wherein the location of the hash value for the first client device and the location of the hash value for the first content server on the circle are determined by normalizing the hash value of the first client device and the hash value of the first content server to between 0 and 1;

selecting the second content server to process the second request, wherein the second content server is selected based on at least the identifier of the second client device and the domain name, and the proximity of a location of a hash value for the second client device on the circle to a location of a hash value for the second content server on the circle, and wherein the location of the hash value for the second client device and the location of the hash value for the second content server on the circle are determined by normalizing the hash value of the second client device and the hash value of the second content server to between 0 and 1;

providing the server identification data for the first content server to the first client device, wherein the first client device stores the server identification data for the first content server enabling the first client device to communicate with the first content server on subsequent requests to the plurality of content servers associated with the domain name while bypassing the allocation server; and providing the server identification data for the second content server to the second client device, wherein the second client device stores the server identification data for the second content server enabling the second client device to communicate with the second content server on subsequent requests to the plurality of content servers associated with the domain name while bypassing the allocation server, wherein the first content server processes the subsequent requests of the first client device consistent with first state data stored at the first content server, the first state data corresponding to the first client device, wherein the second content server processes the subsequent requests of the second client device consistent with second state data stored at the second content server, the second state data corresponding to the second client device, and wherein the first state data includes information related to an interaction between the first client device and the first content server that occurred while processing the first request.

2. The computer-implemented method according to claim 1, further comprising:

receiving an indication that the first content server is unavailable to process subsequent requests from the first client device;

selecting a third content server from the plurality of content servers to handle subsequent requests from the first client device; and providing the server identification data for the third content server to the first client device.

3. The computer-implemented method according to claim 1, implemented by a domain name system ("DNS") server, wherein the first request and the second request include the domain name.

4. The computer-implemented method according to claim 1, wherein the server identification data for the first content server comprises a first internet protocol ("IP") address and the server identification data for the second content server comprises a second IP address.

5. The computer-implemented method according to claim 4, wherein:

a domain name system ("DNS") server provides the first client device and the second client device with a common internet protocol ("IP") address after receiving corresponding initial requests to access the domain name, the first client device sends subsequent requests to the first IP address; and the second client device sends subsequent requests to access the domain name to the second IP address.

6. The computer-implemented method according to claim 4, wherein:

a domain name system ("DNS") server provides the first client device and the second client device with an internet protocol ("IP") address randomly selected from a pool of IP addresses associated with the domain name, the randomly selected address being provided by the DNS server upon receiving corresponding initial requests to access the domain name from the first client device and the second client device, the first client device sends subsequent requests to access the domain name to the first IP address; and the second client device sends subsequent requests to access the domain name to the second IP address.

7. A computer-implemented method for identifying a server, comprising:

storing, at an allocation server, a first set of server identification data for a plurality of content servers associated with a service, wherein the allocation server is configured to store server identification data for multiple pluralities of content servers, each plurality of content servers associated with a different service;

receiving an identifier of a client device;

selecting one of the plurality of content servers to provide the service to the client device in response to receiving the identifier, wherein the content server is selected based on at least the identifier of the client device, and the proximity of a location of a hash value for the client device on a circle to a location of a hash value for the selected content server on the circle, and wherein the location of the hash value for the client device and the location of the hash value for the selected content server on the circle are determined by normalizing the hash value of the client device and the hash value of the selected content server to between 0 and 1; and providing the server identification data for the selected content server to the client device, enabling the client device to store the server identification data for the selected content server and to communicate with the selected content server on subsequent requests to access the service without accessing the allocation server during the subsequent requests, wherein the selected content server receives a request to access the service from the client device, and stores state data at the selected content server, wherein the state data includes information related to an interaction between the client device and the selected content server, and wherein the selected content server processes the subsequent requests consistent with the state data.

8. The computer-implemented method according to claim 7, wherein the state data corresponds to a browsing or connection session between the client device and the selected content server.

9. The computer-implemented method according to claim 8, wherein the state data comprises shopping cart data reflecting items selected for purchase during the browsing or connection session.

10. The computer-implemented method according to claim 7, further comprising:

storing the state data on a backup server selected from the plurality of content servers.

11. The computer-implemented method according to claim 10, further comprising:

receiving an indication that the selected content server is unavailable to process requests from the client device; and providing the client device with the server identification data for the backup server, such that the subsequent requests from the client device to access the service are received by the backup server.

12. The computer-implemented method according to claim 7, wherein selecting one of the plurality of content servers further comprises:
- calculating hash values for the plurality of content servers;
- mapping the hash values for the plurality of content servers to locations on the circle;
- calculating the hash value for the client device;
- mapping the hash value of the client device to the location on the circle.

13. The computer-implemented method according to claim 7, wherein the identifier of the client device comprises a serial number of the client device.

14. The computer-implemented method according to claim 7, wherein the identifier of the client device is received with a Uniform Resource Locator ("URL"), and the URL includes a domain name associated with the service.

15. The computer-implemented method according to claim 14, wherein the identifier of the client device is included as a prefix to the domain name associated with the service.

16. A system comprising:
a processor for executing program instructions; and
a non-transitory computer-readable storage medium storing the program instructions, the program instructions, when executed by the processor, performing a process to:
- store a first set of server identification data for a first plurality of servers associated with a first service;
- store a second set of server identification data for a second plurality of servers associated with a second service;
- receive an identifier of a client device and an identifier of a service, wherein the identifier of the service identifies one of the first service and the second service;
- determine a requested service based, at least in part, on the received identifier of the service;
- select one of a plurality of servers to provide the requested service to the client device, wherein the server is selected based at least on the identifier of the client device and the identifier of the service, and the proximity of a location of a hash value for the client device on a circle to a location of a hash value for the selected server on the circle, and wherein the location of the hash value for the client device and the location of the hash value for the selected server on the circle are determined by normalizing the hash value of the client device and the hash value of the selected server to between 0 and 1; and
- provide the server identification data for the selected server to the client device enabling the client device to store the server identification data for the selected server and to communicate with the selected server on subsequent requests to access the service without accessing the system during the subsequent requests,
wherein the selected server receives a request to access the requested service from the client device, and stores state data at the selected server,
wherein the state data includes information related to an interaction between the client device and the selected server that occurred prior to processing the request, and
wherein the selected server processes the subsequent requests consistent with the state data.

17. A non-transitory computer-readable storage medium storing program instructions for performing a method executed by a processor, the method comprising steps performed by the processor of:
- storing, at an allocation server, a first set of server identification data for a first plurality of servers associated with a first service;
- storing, at the allocation server, a second set of server identification data for a second plurality of servers associated with a second service;
- receiving, at the allocation server, a request to access the first service and an identifier of a client device;
- selecting, based on the request to access the first service, one of the first plurality of servers to provide the service to the client device, wherein the server is selected based on at least the identifier of the client device, and the proximity of a location of a hash value for the client device on a circle to a location of a hash value for the selected server on the circle, and wherein the location of the hash value for the client device and the location of the hash value for the selected server on the circle are determined by normalizing the hash value of the client device and the hash value of the selected server to between 0 and 1; and
- providing the server identification data for the selected server to the client device, enabling the client device to store the server identification data for the selected server and to communicate with the selected server on subsequent requests to access the service without accessing the allocation server during the subsequent requests,
wherein the selected server receives a request to access the service from the client device, and stores state data at the selected server,
wherein the state data includes information related to an interaction between the client device and the selected server, and
wherein the selected server processes the subsequent requests consistent with the state data.

18. A client device comprising:
a processor for executing program instructions; and
a non-transitory computer-readable storage medium storing the program instructions, the program instructions, when executed by the processor, performing a process to request a service comprising:
- transmitting a domain name to a first server, the first server comprising a domain name system ("DNS") server;
- receiving, from the DNS server, identification data of a second server, the second server comprising an allocation server;
- transmitting identification data of the client device to the allocation server, the allocation server configured to store server identification data for multiple pluralities of content servers, each plurality of content servers associated with a different service;
- receiving, from the allocation server, identification data of a third server, the third server comprising a content server from the plurality of content servers associated with the service, wherein the third server is determined based at least in part on the proximity of a location of a hash value for the client device on a circle to a location of a hash value for the third server on the circle, and wherein the location of the hash value for the client device and the location of the hash value for the third server on the circle are determined by normalizing the hash value of the client device and the hash value of the third server to between 0 and 1;

requesting the service from the content server, wherein the content server is configured to store state data related to an interaction between the client device and the content server; and sending a subsequent request to the content server without accessing the allocation server during the subsequent request, wherein the content server is further configured to process the subsequent request consistent with the state data.

19. The client device according to claim 18, wherein the first server and the second server are implemented in the same system.

20. The client device according to claim 18, the process further comprising:

determining whether the DNS server also functions as the allocation server;

when the DNS server also functions as the allocation server, transmitting the domain name and the client identification data together; and when the DNS server does not function as the allocation server, transmitting the domain name to the DNS server separately from transmitting the client identification data to the allocation server.

21. The client device according to claim 18, wherein:

the identification data of the second server is an IP address of the second server; and the identification data of the third server is an IP address of the third server.

* * * * *